(12) United States Patent
Kroczka et al.

(10) Patent No.: US 11,808,135 B2
(45) Date of Patent: Nov. 7, 2023

(54) SYSTEMS AND METHODS TO PERFORM A DOWNHOLE INSPECTION IN REAL-TIME

(71) Applicant: Landmark Graphics Corporation, Houston, TX (US)

(72) Inventors: Sebastian Kroczka, Cracow (PL); Welton Danniel Souza, Dan Haag (NL); Chafaa Badis, Lons (FR); Kashyap Choksey, Sugarland, TX (US); Yoann Santin, London (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/075,526

(22) Filed: Oct. 20, 2020

(65) Prior Publication Data

US 2021/0222539 A1 Jul. 22, 2021

Related U.S. Application Data

(60) Provisional application No. 62/962,009, filed on Jan. 16, 2020.

(51) Int. Cl.
| | | |
|---|---|---|
| *E21B 47/002* | (2012.01) | |
| *G01V 8/02* | (2006.01) | |
| *H04N 7/18* | (2006.01) | |
| *E21B 47/12* | (2012.01) | |
| *E21B 33/13* | (2006.01) | |

(52) U.S. Cl.
CPC ............ *E21B 47/002* (2020.05); *E21B 47/12* (2013.01); *G01V 8/02* (2013.01); *H04N 7/183* (2013.01); *E21B 33/13* (2013.01); *E21B 2200/22* (2020.05)

(58) Field of Classification Search
CPC ........ E21B 47/12; E21B 47/002; E21B 33/13; E21B 2200/22; G01V 8/02; H04N 7/183
See application file for complete search history.

(56) References Cited

U.S. PATENT DOCUMENTS

| | | | |
|---|---|---|---|
| 2002/0096322 A1 | 7/2002 | Barrett et al. | |
| 2009/0177404 A1 | 7/2009 | Hartmann et al. | |
| 2011/0087434 A1* | 4/2011 | Lie .................. | G01N 29/245 |
| | | | 702/8 |
| 2014/0340506 A1* | 11/2014 | Barfoed .................. | E21B 47/26 |
| | | | 348/85 |
| 2015/0007983 A1* | 1/2015 | Tjhang .................... | E21B 10/60 |
| | | | 166/250.01 |
| 2017/0145807 A1* | 5/2017 | Wendorf .................. | G06T 3/40 |

(Continued)

OTHER PUBLICATIONS

International Search Report and Written Opinion issued in corresponding International PCT Application No. PCT/US2020/056898 dated Dec. 21, 2020.

*Primary Examiner* — Caroline N Butcher
(74) *Attorney, Agent, or Firm* — Barnes & Thornburg, LLP (57) ABSTRACT

Systems and methods to perform an automated downhole inspection in real-time are disclosed. A method to perform the downhole inspection includes deploying a camera and a logging tool downhole. The method also includes obtaining real-time transmissions of images from the camera. The method further includes obtaining real-time transmissions of data from the logging tool. The method further includes determining a presence of a downhole anomaly based on the real-time transmissions of images and the real-time transmissions of data.

17 Claims, 4 Drawing Sheets

(56) References Cited

U.S. PATENT DOCUMENTS

| | | |
|---|---|---|
| 2017/0191361 A1* | 7/2017 | Khalaj Amineh ....... G01V 3/38 |
| 2019/0160086 A1 | 6/2019 | Eagle et al. |
| 2019/0169986 A1 | 6/2019 | Storm, Jr. et al. |
| 2020/0190959 A1* | 6/2020 | Gooneratne ......... G08B 21/187 |

* cited by examiner

SYSTEMS AND METHODS TO PERFORM A DOWNHOLE INSPECTION IN REAL-TIME

The present disclosure relates to systems and methods to perform a downhole inspection in real-time.

Tubulars and casings have multiple oil and gas applications, such as, but not limited to, to transport fluids, to prevent cave-ins, and/or to prevent contamination of subterranean formation, convey downhole tools, as well as other applications. A tubular or casing failure can be dangerous, so tubulars and casings are periodically inspected to reduce the likelihood of pipeline or casing failure. Inspections of pipeline casings focus on the structural integrity, filler quantity, quality, and electrical isolation between pipeline and casing.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to perform an automated downhole inspection in real-time. Downhole inspections include inspections of a hydrocarbon well or a hydrocarbon water well, a wellbore of the hydrocarbon well, tubulars deployed in the hydrocarbon well, as well as casings installed in the hydrocarbon well. As referred to herein, a tubular may be coiled tubing, drill pipe, liner, production tubing, or another type of conveyance that has an inner diameter that provides a passageway for fluids and/or downhole tools to pass through. A camera and a logging tool (e.g., a wireline logging tool) are deployed in a wellbore of a hydrocarbon well. In some embodiments, computer vision with machine learning is utilized for automated pattern recognition of one or more anomalies from digital images and videos. Real-time transmissions of images from the camera and transmissions of data from the logging tool are obtained and are analyzed to determine the presence of a downhole anomaly in real-time and based on the real-time data. As referred to herein, an anomaly includes damages to and/or corrosions of a tubular or a casing that is deployed in a wellbore. In one or more of such embodiments, an anomaly along a tubular or a casing is a leak or hole in the tubular or the casing. In one or more of such embodiments, an anomaly along a tubular or a casing includes an area of the tubular or casing that has a thickness that is less than a threshold thickness or is less than the thickness of other areas of the tubular or casing by a threshold amount. In one or more of such embodiments, an anomaly along a tubular or a casing is corrosion along the tubular or casing. In some embodiments, determining the presence of the downhole anomaly is performed while the camera and the logging tool are deployed downhole. In some embodiments, an automated real-time determination of the presence of the downhole anomalies is performed through at least one of computer vision and artificial intelligence techniques based on the real-time transmissions of the images and the data to determine the presence of the downhole anomalies.

In some embodiments, computer vision with machine learning is utilized to automatically determine the presence of the downhole anomaly. In one or more of such embodiments, the downhole anomaly is compared with one or more downhole anomalies present in a similar downhole environment. In one or more of such embodiments, an improvement or an optimization to a well intervention operation is determined based on the presence of the downhole anomaly. More particularly, computer vison and deep learning are utilized to classify images of anomalies. Further, the classified images are analyzed in combination with machine learning models that are based on cased hole log data to determine precisely the anomaly type and depth. In one or more of such embodiments, an improvement or an optimization to a recompletion operation is determined based on the presence of the downhole anomaly. More particularly, the presence of the downhole anomaly and similar downhole anomalies are analyzed and compared to each other to determine an optimal recompletion operation or a recompletion operation that exceeds a set of criteria associate with the recompletion operation. In one or more of such embodiments, improved anomaly detection and interpretation for multiple wells reduce time spent to compare anomalies versus different wells completions, and reduce time spent to determine which design is vulnerable to the anomaly relative to other designs. In one or more of such embodiments, an improvement to a plug and abandon operation is determined based on the presence of the downhole anomaly. More particularly, the presence of the downhole anomaly and similar downhole anomalies are analyzed and compared to each other to determine an optimal location to set a plug or a location that satisfies a set of criteria for setting a plug, and the amount of casing or tubing that should be retrieved or reused during a plug and abandon operation. In one or more of such embodiments, an improvement of the time spent identifying the downhole anomaly results in a faster determination of where to set a permanent plug and how much the amount of casing or tubing that should be retrieved or reused during a plug and abandon operation. In some embodiments, an analysis of the downhole anomaly is performed and a determination of how to improve performance of a yet-to-be deployed tubular or casing is made based on an analysis of the downhole anomaly. Additional descriptions of the foregoing operations are provided in the paragraphs below and are illustrated in at least FIGS. 1A-4.

Figure 1A:
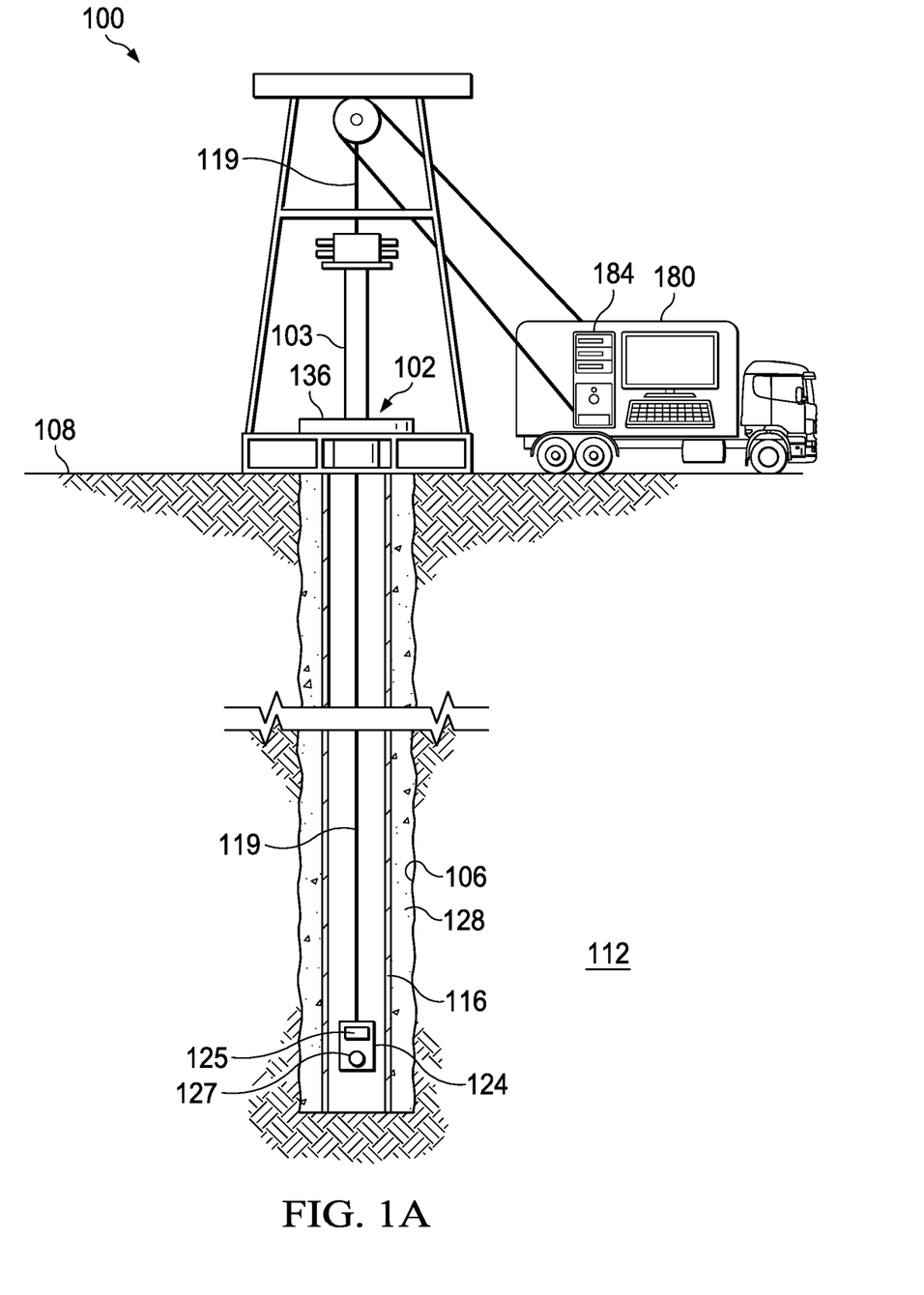
FIG. 1A is a schematic view of a wireline logging environment in which a real-time downhole inspection tool is deployed on a wireline in an annulus of a casing.
Figure 1B:
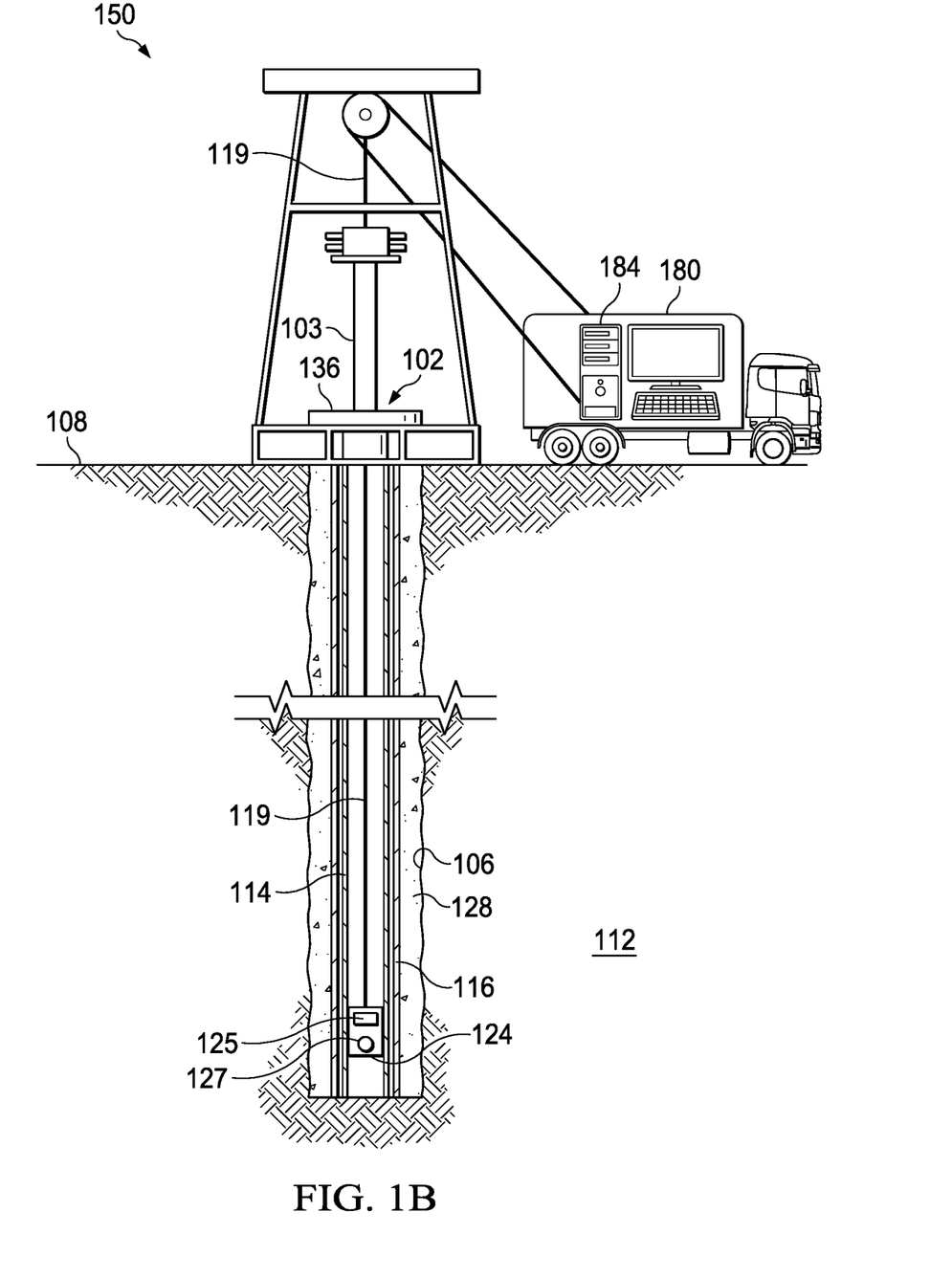
FIG. 1B is a schematic view of a wireline logging environment in which the real-time downhole inspection tool of FIG. 1A is deployed on a wireline inside a tubular.

Now turning to the figures, FIG. 1A illustrates a schematic view of a wireline logging environment 100 in which a real-time downhole inspection tool 124 is deployed on a wireline 119 in a wellbore 106. Similarly, FIG. 1B is a schematic view of a wireline logging environment 150 in which downhole inspection tool 124 of FIG. 1A is deployed on wireline 119 in a tubular 114. In the embodiments of FIGS. 1A and 1B, data is transmitted via a cable of wireline 119 of FIG. 1A. Additional discussions of various components of real-time downhole inspection tool 124 are provided in the paragraphs below and are illustrated in at least FIG. 2.

In the embodiments of FIGS. 1A and 1B, a well 102 having wellbore 106 extends from a surface 108 of the well 102 to or through a subterranean formation 112. A casing 116 is deployed along wellbore 106 to insulate downhole tools and strings deployed in casing 116, to provide a path for hydrocarbon resources flowing from subterranean formation 112, to prevent cave-ins, and/or to prevent contamination of subterranean formation 112. Casing 116 is normally surrounded by a cement sheath 128, which is deposited in an annulus between the casing 116 and wellbore 106 to fixedly secure casing 116 to the wellbore 106 and to form a barrier that isolates casing 116. Although not depicted, there may be layers of casing concentrically placed in wellbore 106, each having a layer of cement or the like deposited thereabout.

A vehicle 180 carrying real-time downhole inspection system 184 and wireline 119 is positioned proximate to the well 102. Wireline 119, along with real-time downhole inspection tool 124 having a logging tool 125 and a camera 127 are lowered through the blowout preventer 103 and wellhead 136 into the well 102. Data indicative of measurements obtained by logging tool 125 may be transmitted via wireline 119 or via another telemetry system to surface 108 for processing by real-time downhole inspection system 184 or by another electronic device operable to process data obtained by logging tool 125. In the embodiment of FIG. 1A, data obtained by logging tool 125 and images obtained by camera 127 of real-time downhole inspection tool 124 are transmitted to downhole inspection system 184 while real-time downhole inspection tool 124 is traversing the interior of casing 116.

Real-time real-time downhole inspection system 184 may include any electronic and/or optoelectronic device operable to receive data and/or process data indicative of one or more formation properties to determine the formation properties. In the embodiment of FIG. 1A, real-time downhole inspection system 184 is stored on vehicle 180. In some embodiments, real-time downhole inspection system 184 may also be housed in a temporary and/or permanent facility (not shown) proximate to the well 102. In other embodiments, the real-time downhole inspection system 184 may also be deployed at a remote location relative to the well 102. Additional operations of real-time downhole inspection system 184 are provided in the paragraphs below.

real-timeIn the embodiments of FIGS. 1A and 1B, data is transmitted via a cable of wireline 119 to real-time downhole inspection system 184. Real-time downhole inspection system 184 performs operations described herein to determine a presence of a downhole anomaly based on the real-time transmissions of the images and the data. In some embodiments, real-time downhole inspection system 184 utilizes one or more computer vision algorithms with machine learning to analyze the received data indicative of images and logging data obtained by camera 127 and logging tool 125.

In some embodiments, where real-time downhole inspection system 184 is deployed in a casing such as casing 116 of FIG. 1A, real-time downhole inspection system 184 compares the received data with historical data obtained from previous runs in casing 116 of FIG. 1A, or other tubulars (not shown). In some embodiments, where real-time downhole inspection system 184 is deployed in a tubular such as tubular 114 of FIG. 1B, real-time downhole inspection system 184 compares the received data with historical data obtained from previous runs in tubular 114 of FIG. 1B, or other tubulars (not shown). In one or more of such embodiments, real-time downhole inspection system 184 utilizes machine learning algorithms to dynamically compare data obtained from camera 127 and logging tool 125 with previous casing or tubing inspection operations. For example, real-time downhole inspection system 184 compares data from previous measurements of casing 116 or tubular 114 (e.g., made one month ago, one year ago, or another time) with current measurements to determine the presence of corrosions, leaks, or other types of anomalies, and whether the detected anomalies have increased or worsened over time. In one or more of such embodiments, real-time downhole inspection system 184 also predicts when the detected anomalies (e.g., corrosion) would cause casing 116 or tubular 114 to fail, measurements to be taken (e.g., applying a sealing material to the corroded section, replacing the corroded section, as well as other potential operations), cost of each alternative measurement, and the likelihood of success of each alternative measurement. In some embodiments, real-time downhole inspection system 184 analyzes data indicative of images and logging data obtained by camera 127 and logging tool 125 to determine the presence of corrosion, leaks, and/or other types of anomalies while real-time downhole inspection tool 124 is deployed downhole. In some embodiments, real-time downhole inspection system 184 compares data indicative of images from camera 127 with the logging data obtained from logging tool 125 to assess the presence of corrosion, leaks, and/or other types of anomalies and to confirm the presence of corrosion, leaks, and/or other types of anomalies).

In some embodiments, real-time downhole inspection system 184 includes a storage medium containing instructions to obtain real-time transmissions of data from logging tool 125 and images from camera 127, and to determine a presence of a downhole anomaly based on the real-time transmissions of the data and images. Additional descriptions of the operations of real-time downhole inspection system 184 and operations performed to conduct a downhole inspection are provided in the paragraphs below and are illustrated in at least FIGS. 3 and 4. Although FIGS. 1A and 1B each illustrates a single real-time downhole inspection tool 124 deployed downhole, in some embodiments, multiple downhole inspection tools (not shown) are simultaneously deployed in a well to monitor different sections of casing and tubulars that are disposed in the well. In one or more of such embodiments, images and data obtained by the real-time downhole inspection tools are transmitted via one or more wirelines, such as wireline 119 of FIGS. 1A and 1B to real-time downhole inspection system 184. Further, although the foregoing paragraphs describe transmitting images and data via wireline 119, in some embodiments, images and data are transmitted acoustically, optically, wirelessly, or by other types of telemetric systems, from real-time downhole inspection tool 124 to real-time downhole inspection system 184. In some embodiments, real-time downhole inspection system 184 is a downhole system. In one or more of such embodiments, real-time downhole inspection system 184 is an onboard component of real-time downhole inspection tool 124. In other embodiments, real-time downhole inspection tool 124 is a component of real-time downhole inspection system 184.

Figure 2:
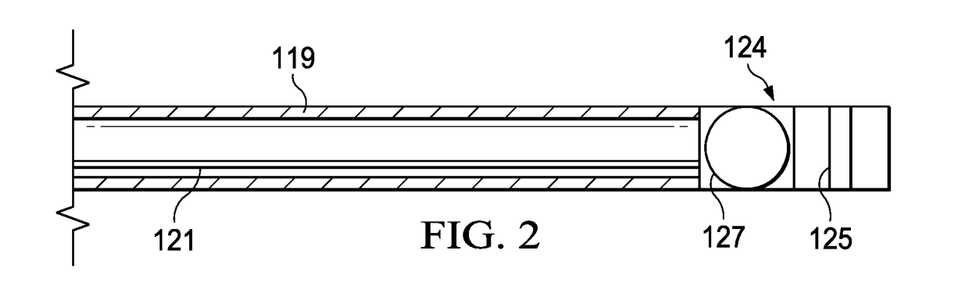
FIG. 2 is a schematic, side view of a real-time downhole inspection tool that is deployable in a wellbore of a hydrocarbon well.

FIG. 2 illustrates a real-time downhole inspection tool 124 that is deployable in a wellbore of a hydrocarbon well. Real-time downhole inspection tool 124 has a logging tool 125 and a camera 127. In the embodiment of FIG. 2, real-time downhole inspection tool 124 is suspended by wireline 119 having a cable 121 inside wireline 119. In some embodiments, cable 121 is a hybrid cable that provides both power and data transmission to real-time downhole inspection tool 124. In one or more of such embodiments, cable 121 includes a fiber optical cable that provides data transmission (such as images obtained by camera 127 and data obtained by logging tool 125) to and from real-time downhole inspection tool 124 and an electrical cable that provides power to components of real-time downhole inspection tool 124. In some embodiments, cable 121 and real-time downhole inspection tool 124 are lowered through a blowout preventer or a wellhead of a well into a wellbore of the well. In one or more of such embodiments, where existing tubulars ("pipes") are installed in the wellbore, real-time downhole inspection tool 124 is lowered into the pipes to provide real-time analysis of anomalies (e.g., corrosion) inside the pipes. In one or more of such embodiments, while real-time downhole inspection tool 124 is lowered into the pipes, camera 127 continuously scans areas of the pipes near real-time downhole inspection tool 124 for leaks, corrosions, as well as other types of anomalies. Similarly, logging tool 125 continuously determines and logs data indicative of leaks, corrosions, as well as other types of anomalies near real-time downhole inspection tool 124. Images and data obtained by camera 127 and logging tool 125 are continuously or periodically transmitted via cable 121. In some embodiments, the images and data are transmitted to a surface-based electronic device (e.g., desktop computer, lap top computer, server system, or other types of electronic device operable to perform processing operations described herein) to perform operations described herein and illustrated in at least FIGS. 3 and 4. In some embodiments, the images and data are transmitted to an electronic device that is located in a downhole location. In some embodiments, real-time downhole inspection tool 124 includes an onboard processor that is operable to receive the images and data obtained by camera 127 and logging tool 125 and perform the operations described herein and illustrated in FIGS. 3 and 4.

Data indicative of images and logging data obtained by camera 127 and logging tool 125 are analyzed and assessments of the presence of corrosion, leaks, and/or other types of anomalies are dynamically determined while real-time downhole inspection tool 124 is deployed downhole. In some embodiments, data indicative of images from camera 127 are compared with the logging data obtained from logging tool 125 to assess the presence of corrosion, leaks, and/or other types of anomalies (e.g., data indicative of the images obtained from camera 127 and logging data obtained from logging tool 125 are compared with each other to confirm the presence of corrosion, leaks, and/or other types of anomalies). In one or more of such embodiments, data indicative of images from camera 127 and from the logging tool 125 used to complement each other to improve the accuracy of real-time downhole inspection tool 124 (e.g., using data indicative of the images obtained from camera 127 to determine location and area of a leak in the pipe, and using logging data obtained from logging tool 125 to perform a volumetric analysis of the leak).

In some embodiments, real-time downhole inspection tool 124 also includes additional components (not shown) that obtain downhole measurements. In one or more of such embodiments, real-time downhole inspection tool 124 includes calipers, electromagnetic tools, acoustic tools, and/or other types of tools that measure the thickness of tubulars and casings that are installed in the wellbore.

Figure 3:
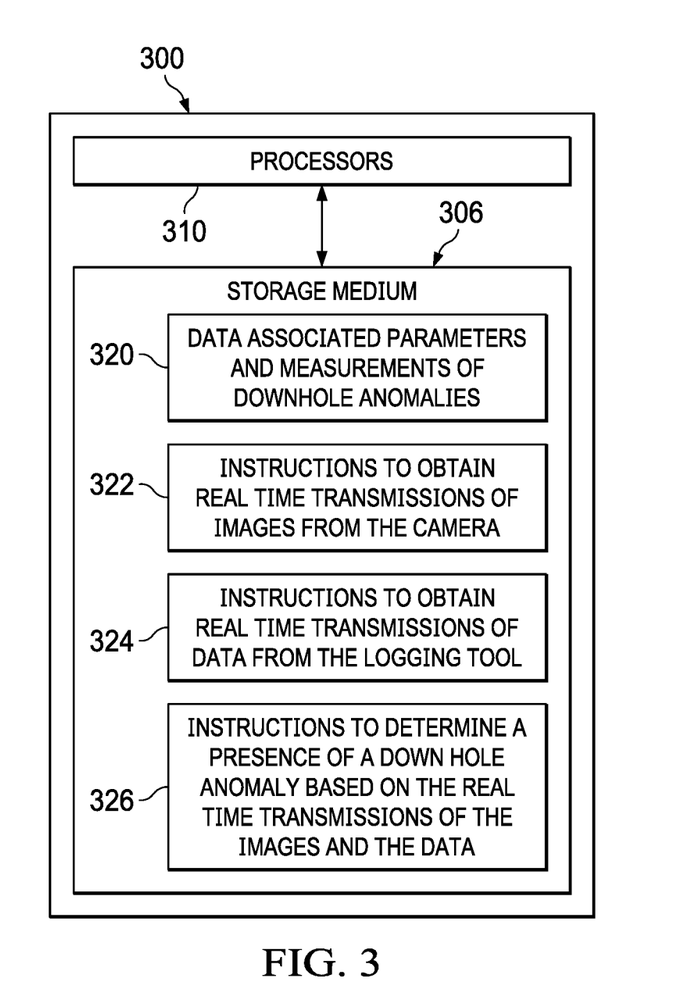
FIG. 3 is a system diagram of the real-time downhole inspection system of FIGS. 1A and 1B.

FIG. 3 is a system diagram 300 of real-time downhole inspection system 184 of FIGS. 1A and 1B. Real-time downhole inspection system 184 includes a storage medium 306 and processors 310. In the embodiments of FIG. 3, processors 310 are onboard processors of real-time downhole inspection system 184. In some embodiments, processors 310 are remote processors. Storage medium 306 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 306 includes multiple data storage devices. In further embodiments, the multiple data storage devices may be physically stored at different locations. Data indicative of parameters and measurements of downhole anomalies are stored at a first location 320 of storage medium 306. In some embodiments, historical data of previous runs are also stored at first location 320.

As shown in FIG. 3, instructions to obtain real-time transmissions of images from the camera are stored at a second location 322 of storage medium 306. Further, instructions to obtain real-time transmissions of data from the logging tool are stored at a third location 324 of the storage medium 306. Further, instructions to determine a presence of a downhole anomaly based on the real-time transmissions of the images and the data are stored at a fourth location 326 of storage medium 306. Instructions to perform operations described herein are stored at other locations of storage medium 306. In some embodiments, processors 310 and storage medium 310 are components of real-time downhole inspection tool 124 of FIGS. 1A, 1B, and 2.

Figure 4:
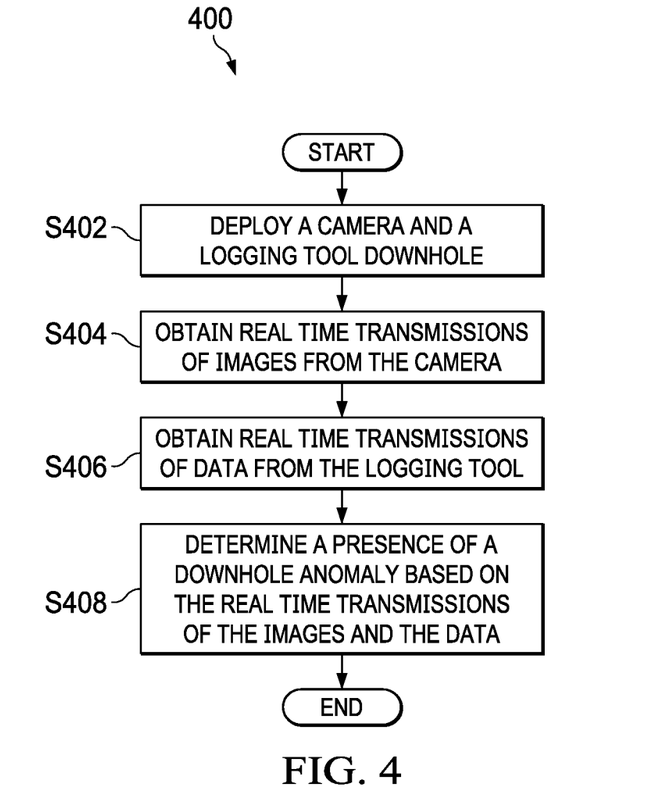
FIG. 4 illustrates a process to perform real-time downhole inspection.

FIG. 4 illustrates a process 400 to perform automated real-time downhole inspection. Although the operations in process 400 are shown in a particular sequence, certain operations may be performed in different sequences or at the same time where feasible. Further, although some of the operations are described to be performed by processors 310 of real-time downhole inspection system 184 of FIGS. 1A and 1B, the operations may be performed by other processors of other electronic devices.

At block S402, a camera and a logging tool are deployed downhole. In that regard, FIG. 1A illustrates real-time downhole inspection tool 124 deployed in casing 119 of wellbore 106. Similarly, FIG. 1B illustrates real-time downhole inspection tool 124 deployed in tubular 114 that runs through wellbore 106. At block S404, processors 310 obtain real-time transmissions of images from the camera. At block S406, processors 310 obtain real-time transmissions of data from the logging tool. In the embodiments of FIGS. 1A, 1B, and 2, for example, data indicative of images obtained by camera 127 of real-time downhole inspection tool 124 and logging data obtained by logging tool 125 of real-time downhole inspection tool 124 are transmitted by cable 121 of wireline 119. In some embodiments, data is transmitted uphole via cable 121 and is subsequently wirelessly transmitted to real-time downhole inspection system 184. In some embodiments, data is transmitted from real-time downhole inspection tool 124 to real-time downhole inspection system 184 acoustically, optically, wirelessly, or through another telemetry system.

At block S408, processors 310 automatically determine a presence of a downhole anomaly based on the real-time transmissions of the images and the data. In some embodiments, processors 310 utilize computer vision with machine learning to determine the presence of the downhole anomaly. In one or more of such embodiments, processors 310 compare a downhole anomaly with one or more downhole anomaly present in a similar downhole environment. For example, after processors 310 determine the existence of a downhole anomaly in casing 119 of FIG. 1A, processors 310 determine the presence of another downhole anomaly that is present or was present within a threshold period of time (such as within one day, one week, one month, or another period of time), and within a threshold distance (such as within one meter, 10 meters, 100 meters, or another distance) of the downhole anomaly. Processors 310 then compare the downhole anomaly with the pre-existing anomaly. In one or more of such embodiments, processors 310 determine the severity of the downhole anomaly based on the severity of the pre-existing anomaly. In one or more of such embodiments, processors 310 determine how to address the anomaly (such as whether to repair the anomaly, seal the tubular or casing, or another course of action to address the anomaly) based on how the pre-existing anomaly was or is being addressed.

In some embodiments, processors 310 determine an improvement or an optimization to a well intervention operation based on the presence of the downhole anomaly. In one or more of such embodiments, processors 310 determine an improvement to a well intervention operation based on data obtained from the real-time transmissions of the images and the data. In one or more of such embodiments, processors 310 determine an improvement or an optimization based on the presence of the downhole anomaly. In one or more of such embodiments, processors 310 determine an improvement to a plug an abandon operation based on the presence of the downhole anomaly. In some embodiments, processors 310 perform an analysis of the downhole anomaly and determine how to improve performance of a yet-to-be deployed tubular or casing is made based on an analysis of the downhole anomaly. In some embodiments, processors 310 analyze operations performed to repair or improve the anomaly (such as operations performed to seal a leak), and the cost of such operations (such as the cost associated with sealing a nearby valve during the process to seal the leak). In one or more of such embodiments, processors 310 determine one or more operations that would reduce the material cost of future operations to repair or improve similar anomalies. In some embodiments, processor 310 analyzes the performance of a current or previous downhole inspection operation, and determines one or more improvements to the performance of a subsequent downhole inspection operation based on the analysis of the performance of the current or previous downhole inspection operation.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to perform downhole inspection in real-time, the method comprising: deploying a camera and a logging tool downhole; obtaining real-time transmissions of images from the camera; obtaining real-time transmissions of data from the logging tool; and determining a presence of a downhole anomaly based on the real-time transmissions of images and the real-time transmissions of data.

Clause 2, the method of clause 1, wherein determining the presence of the downhole anomaly comprises performing an automated real-time determination of a presence of the downhole anomaly through computer vision and artificial intelligence techniques based on the real-time transmissions of images and the real-time transmissions of data.

Clause 3, the method of clauses 1 or 2, wherein determining the presence of the downhole anomaly is performed while the camera and the logging tool are deployed downhole.

Clause 4, the method of any of clauses 1-3, further comprising utilizing artificial intelligence techniques to determine the presence of the downhole anomaly.

Clause 5, the method of clause 4, further comprising utilizing computer vision with machine learning to determine the presence of the downhole anomaly.

Clause 6, the method of clause 5, wherein utilizing computer vision with machine learning comprises comparing the downhole anomaly with another downhole anomaly present in a similar downhole environment.

Clause 7, the method of clauses 5 or 6, further comprising determining, based on the presence of the downhole anomaly, an improvement to a well intervention operation.

Clause 8, the method of clauses 5 or 6, further comprising determining, based on the presence of the downhole anomaly, an improvement to a recompletion operation.

Clause 9, the method of clauses 5 or 6, further comprising determining, based on the presence of the downhole anomaly, an improvement to a plug and abandon operation.

Clause 10, the method of any of clauses 1-9, further comprising: analyzing the downhole anomaly; and improving performance of a subsequent downhole inspection operation based on an analysis of the downhole anomaly.

Clause 11, a downhole inspection system, comprising a storage medium; and one or more processors configured to: obtain real-time transmissions of images from a camera of a logging tool; obtain real-time transmissions of data from the logging tool; and determine a presence of a downhole anomaly based on the real-time transmissions of images and the real-time transmissions of data.

Clause 12, the downhole inspection system of clause 11, wherein the one or more processors are further configured to analyze the downhole anomaly; and improve performance of a subsequent downhole inspection operation based on an analysis of the downhole anomaly.

Clause 13, the downhole inspection system of clauses 11 or 12, wherein the presence of the downhole anomaly is determined while the camera and the logging tool are deployed downhole.

Clause 14, the downhole inspection system of any of clauses 11-13, wherein the one or more processors are further configured to utilize artificial intelligence techniques to determine the presence of the downhole anomaly.

Clause 15, the downhole inspection system of any of clauses 11-14, wherein the one or more processors are further configured to utilize computer vision with machine learning to determine the presence of the downhole anomaly.

Clause 16, the downhole inspection system of clause 15, wherein the one or more processors are further configured to: utilize computer vision with machine learning to compare the downhole anomaly with another downhole anomaly present in a similar downhole environment; and determine the presence of the downhole anomaly based on a comparison of the downhole anomaly with another downhole anomaly present in a similar downhole environment.

Clause 17, a machine-readable medium comprising instructions stored therein, which when executed by one or more processors, causes the one or more processors to perform operations comprising: obtaining real-time transmissions of images from a camera of a logging tool; obtaining real-time transmissions of data from the logging tool; determining a presence of a downhole anomaly based on the real-time transmissions of images and the real-time transmissions of data; analyzing the downhole anomaly; and improving performance of a subsequent downhole inspection operation based on an analysis of the downhole anomaly.

Clause 18, the machine-readable medium of clause 17, further comprising instructions stored therein, which when executed by one or more processors, causes the one or more processors to perform operations comprising utilizing artificial intelligence techniques to determine the presence of the downhole anomaly.

Clause 19, the machine-readable medium of clauses 17 or 18, further comprising instructions stored therein, which when executed by one or more processors, causes the one or more processors to perform operations comprising utilizing computer vision with machine learning to determine the presence of the downhole anomaly.

Clause 20, the machine-readable medium of any of clauses 17-19, further comprising instructions stored therein, which when executed by one or more processors, causes the one or more processors to perform operations comprising: utilizing computer vision with machine learning to compare the downhole anomaly with another downhole anomaly present in a similar downhole environment; and determining the presence of the downhole anomaly based on a comparison of the downhole anomaly with another downhole anomaly present in a similar downhole environment.

As used herein, the singular forms "a," "an," and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to perform post drilling downhole inspection in real-time, the method comprising:
    after completion of a drilling operation and a completion operation, deploying a camera and a logging tool downhole; wherein the logging tool comprises at least one of a caliper, an electromagnetic tool, or an acoustic tool;
    obtaining real-time transmissions of images from the camera; wherein the camera captures images of a tubular or casing;
    obtaining real-time transmissions of data from the logging tool; wherein the logging tool measures the thickness of a tubular or casing; and
    determining, via an artificial intelligence technique, a presence of a downhole anomaly based on the real-time transmissions of images and the real-time transmissions of data of the tubular or casing;
    comparing the real-time transmissions of images and the real-time transmissions of data with previous images and data of the tubular or casing; and
    providing a prediction of when the downhole anomaly could cause the tubular or casing to fail.

2. The method of claim 1, wherein determining the presence of the downhole anomaly comprises performing an automated real-time determination of a presence of the downhole anomaly through computer vision and artificial intelligence techniques based on the real-time transmissions of images and the real-time transmissions of data.

3. The method of claim 1, wherein determining the presence of the downhole anomaly is performed while the camera and the logging tool are deployed downhole.

4. The method of claim 1, further comprising utilizing computer vision with machine learning to determine the presence of the downhole anomaly.

5. The method of claim 4, wherein utilizing computer vision with machine learning comprises comparing the downhole anomaly with another downhole anomaly present in a similar downhole environment.

6. The method of claim 4, further comprising determining, based on the presence of the downhole anomaly, an improvement to a well intervention operation.

7. The method of claim 4, further comprising determining, based on the presence of the downhole anomaly, an improvement to a recompletion operation.

8. The method of claim 4, further comprising determining, based on the presence of the downhole anomaly, an improvement to a plug and abandon operation.

9. The method of claim 1, further comprising:
    analyzing the downhole anomaly; and
    improving performance of a subsequent downhole inspection operation based on an analysis of the downhole anomaly.

10. A downhole inspection system, comprising:
    a storage medium; and
    one or more processors configured to:
        after completion of a drilling operation and a completion operation obtain real-time transmissions of images from a camera of a logging tool; wherein the camera captures images of a tubular or casing;
        obtain real-time transmissions of data from the logging tool; wherein the logging tool comprises at least one of a caliper, an electromagnetic tool, or an acoustic tool; wherein the logging tool measures the thickness of a tubular or casing; and
        determine, via an artificial intelligence technique, a presence of a downhole anomaly based on the real-time transmissions of images and the real-time transmissions of data of the tubular or casing;

compare the real-time transmissions of images and the real-time transmissions of data with previous images and data of the tubular or casing; and provide a prediction of when the downhole anomaly could cause the tubular or casing to fail; wherein the downhole tool is deployed in a wellbore after completion of the drilling operation and the completion operation.

11. The downhole inspection system of claim 10, wherein the one or more processors are further configured to:

analyze the downhole anomaly; and improve performance of a subsequent downhole inspection operation based on an analysis of the downhole anomaly.

12. The downhole inspection system of claim 10, wherein the presence of the downhole anomaly is determined while the camera and the logging tool are deployed downhole.

13. The downhole inspection system of claim 10, wherein the one or more processors are further configured to utilize computer vision with machine learning to determine the presence of the downhole anomaly.

14. The downhole inspection system of claim 13, wherein the one or more processors are further configured to:

utilize computer vision with machine learning to compare the downhole anomaly with another downhole anomaly present in a similar downhole environment; and determine the presence of the downhole anomaly based on a comparison of the downhole anomaly with another downhole anomaly present in a similar downhole environment.

15. A machine-readable medium comprising instructions stored therein, which when executed by one or more processors, causes the one or more processors to perform operations comprising:

after completion of a drilling operation and a completion operation, obtaining real-time transmissions of images from a camera of a logging tool; wherein the camera captures images of a tubular or casing;

obtaining real-time transmissions of data from the logging tool; wherein the logging tool comprises at least one of a caliper, an electromagnetic tool, or an acoustic tool; wherein the logging tool measures the thickness of a tubular or casing;

determining, via an artificial intelligence technique, a presence of a downhole anomaly based on the real-time transmissions of images and the real-time transmissions of data of the tubular or casing;

comparing the real-time transmissions of images and the real-time transmissions of data with previous images and data of the tubular or casing; and providing a prediction of when the downhole anomaly could cause the tubular or casing to fail;

analyzing the downhole anomaly; and improving performance of a subsequent downhole inspection operation based on an analysis of the downhole anomaly, wherein the downhole tool is deployed in a wellbore after completion of the drilling operation and the completion operation.

16. The machine-readable medium of claim 15, further comprising instructions stored therein, which when executed by one or more processors, causes the one or more processors to perform operations comprising utilizing computer vision with machine learning to determine the presence of the downhole anomaly.

17. The machine-readable medium of claim 15, further comprising instructions stored therein, which when executed by one or more processors, causes the one or more processors to perform operations comprising:

utilizing computer vision with machine learning to compare the downhole anomaly with another downhole anomaly present in a similar downhole environment; and determining the presence of the downhole anomaly based on a comparison of the downhole anomaly with another downhole anomaly present in a similar downhole environment.

* * * * *